US012682431B2

(12) United States Patent
Shyam et al.

(10) Patent No.: US 12,682,431 B2
(45) Date of Patent: Jul. 14, 2026

(54) NOISE, FLARE, AND/OR OTHER DEGRADATION SUPPRESSION AND/OR REMOVAL FOR IMAGES

(71) Applicant: Faurecia IRYStec Inc., Montreal (CA)

(72) Inventors: Pranjay Shyam, Montreal (CA); Hyunjin Yoo, Nepean (CA); Tara Akhavan, Paris (FR)

(73) Assignee: Faurecia IRYStec, Inc., Montreal (CA)

( * ) Notice: Subject to any disclaimer, the term of this patent is extended or adjusted under 35 U.S.C. 154(b) by 186 days.

(21) Appl. No.: 18/397,684

(22) Filed: Dec. 27, 2023

(65) Prior Publication Data

US 2025/0217934 A1 Jul. 3, 2025

(51) Int. Cl.
G06T 5/60 (2024.01)
G06T 5/70 (2024.01)

(52) U.S. Cl.
CPC .................. G06T 5/60 (2024.01); G06T 5/70 (2024.01); *G06T 2207/10024* (2013.01); *G06T 2207/20081* (2013.01); *G06T 2207/20084* (2013.01); *G06T 2207/30252* (2013.01)

(58) Field of Classification Search
CPC ... G06T 5/60; G06T 5/70; G06T 2207/10024; G06T 2207/20081; G06T 2207/20084; G06T 2207/30252
See application file for complete search history.

(56) References Cited

U.S. PATENT DOCUMENTS 10,839,495 B2    11/2020   Chesnokov
11,468,265 B2 *  10/2022   Chhabra .................. G06N 3/09
(Continued)

FOREIGN PATENT DOCUMENTS

CN        114170461 A      3/2022
CN        112927151 B  *  9/2023  ............... G06T 5/70
WO        2022207110 A1    10/2022

OTHER PUBLICATIONS

Ernst et al.., Interactive rendering of caustics using interpolated warped volumes. GI '05: Proceedings of Graphics Interface 2005. 87-96. 10.1145/1089508.1089523.
(Continued)

*Primary Examiner* — Stephen G Sherman
(74) *Attorney, Agent, or Firm* — Reising Ethington P.C.

(57) ABSTRACT

A system and method is provided for enhancing an image using a machine learning model. The method includes: obtaining image data; and generating enhanced image data representing an enhanced image based on performing inference for the machine learning model. The machine learning model has an inference encoder configured to generate latent image feature data based on the image data and at least one decoder configured to receive the latent image feature data from the inference encoder. Knowledge is imparted into the inference encoder from one or more teacher encoders as a result of a knowledge transfer training process. The knowledge transfer training process includes: training each of the one or more teacher encoders as a part of a teacher network configured to perform an image reconstruction task based on learned knowledge obtained by the teacher encoder, and transferring the learned knowledge of the teacher encoder to the inference encoder.

20 Claims, 8 Drawing Sheets

(56) References Cited

U.S. PATENT DOCUMENTS

| | | | |
|---|---|---|---|
| 11,734,837 B2 * | 8/2023 | Sun | G06T 7/0014 |
| | | | 382/100 |
| 2021/0150330 A1 * | 5/2021 | Sharma | G06N 3/0464 |
| 2022/0036534 A1 * | 2/2022 | Chakrabarty | G06T 5/77 |

OTHER PUBLICATIONS

Zhang et al., "FFDNet: Toward a Fast and Flexible Solution for CNN-Based Image Denoising," in IEEE Transactions on Image Processing, vol. 27, No. 9, pp. 4608-4622, Sep. 2018, doi: 10.1109/TIP.2018.2839891.

Zhang et al. "Designing a practical degradation model for deep blind image super-resolution." Proceedings of the IEEE/CVF International Conference on Computer Vision. 2021.

* cited by examiner

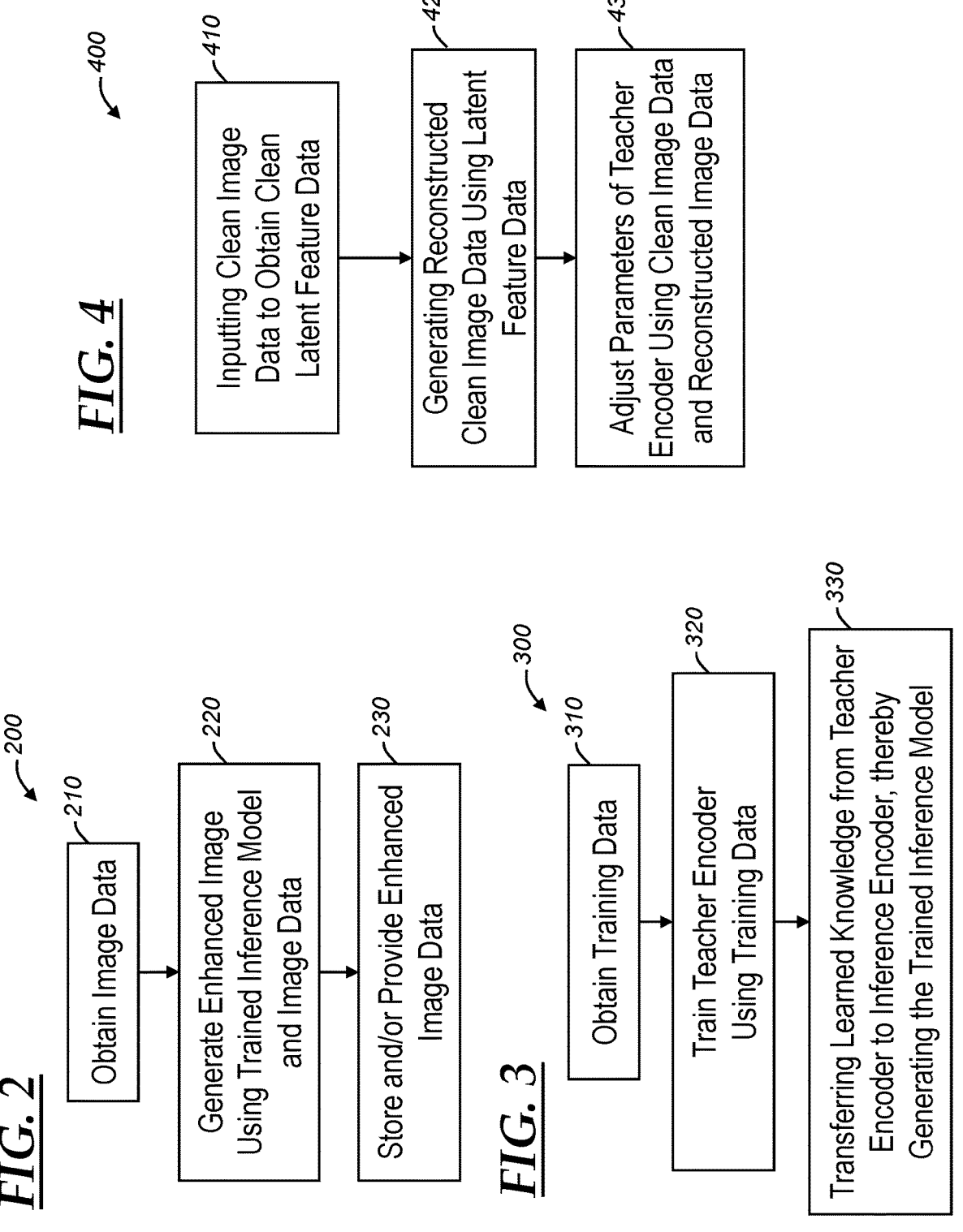

_FIG. 4_

400

410 — Inputting Clean Image Data to Obtain Clean Latent Feature Data

420 — Generating Reconstructed Clean Image Data Using Latent Feature Data

430 — Adjust Parameters of Teacher Encoder Using Clean Image Data and Reconstructed Image Data

_FIG. 2_

200

210 — Obtain Image Data

220 — Generate Enhanced Image Using Trained Inference Model and Image Data

230 — Store and/or Provide Enhanced Image Data

_FIG. 3_

300

310 — Obtain Training Data

320 — Train Teacher Encoder Using Training Data

330 — Transferring Learned Knowledge from Teacher Encoder to Inference Encoder, thereby Generating the Trained Inference Model

NOISE, FLARE, AND/OR OTHER DEGRADATION SUPPRESSION AND/OR REMOVAL FOR IMAGES

TECHNICAL FIELD

This invention relates to methods and systems for image signal processing (ISP) and, more particularly, noise and flare suppression techniques for enhancing an image.

BACKGROUND

An image signal processing (ISP) pipeline plays a pivotal role in transforming incident light captured by a camera into human-perceivable information. Traditionally, this involves a multi-stage process encompassing tasks like defective pixel correction, black level correction, lens shading correction, auto exposure, auto-focus, and auto white balance. Following these initial stages, demosaicing, noise reduction, color manipulation, and super resolution are executed, prioritizing high perceptual fidelity and image sharpness aligned with human visual perception. While digital single-lens reflex (DSLR) cameras excel in image quality due to superior dynamic range, color accuracy, and low-light performance, their bulky form factor limits their applicability in compact sensor-reliant scenarios like automotive applications for advanced driving assistance. Compact sensors with smaller pixel sizes are favored in such contexts, albeit at the expense of image quality, characterized by a lower signal-to-noise ratio. To address this, recent advancements have introduced deep learning-based end-to-end mapping algorithms. These algorithms aim to bridge the quality gap by transforming RAW images from low-quality smartphone cameras into RGB images akin to those from DSLR cameras, offering promising solutions to enhance image quality in challenging environments.

In the realm of ISP, a notable drawback of the prevalent one-to-one mapping approach lies in its susceptibility to biases stemming from variations in sensors and illumination. Alterations in scene illumination and lens configurations, often arising from lens degradation, can significantly compromise the performance of such learning-based ISPs. This challenge is particularly pronounced in automotive settings, characterized by multiple illumination sources and cameras situated on vehicle bodies, rendering lenses more prone to degradation.

In the realm of automotive scene illumination variations, particularly focusing on the intricacies arising from localized illumination sources, a scenario marked by the coexistence of high and low exposed regions within images often arises. The consequence of such a lighting environment is a heightened prevalence of noise, characterized by varying intensity, predominantly concentrated in low light regions. This intricate noise distribution defies modeling using conventional noise models, such as additive white Gaussian noise (AWGN), JPEG compression noise, Poisson noise, and camera sensor noise.

In addition to noise, lens flare, which stems from non-image-forming light interacting with a camera's lens system, poses a significant challenge to imaging quality. This phenomenon, characterized as either scattering or reflective flare, detrimentally affects the visual output. Scattering flare arises from interactions with lens defects, while reflective flare results from reflections between lens elements. Current mechanisms predominantly concentrate on flare removal, a strategy unsuitable for automotive settings as it modifies the original image.

SUMMARY

According to one aspect of the disclosure, there is provided a method of enhancing an image using a machine learning model. The method includes: obtaining image data representing an image; and generating enhanced image data representing an enhanced image based on performing inference for the machine learning model. The machine learning model has an inference encoder configured to generate latent image feature data based on the image data and at least one decoder configured to receive the latent image feature data from the inference encoder. Knowledge is imparted into the inference encoder from one or more teacher encoders as a result of a knowledge transfer training process. The knowledge transfer training process includes: training each of the one or more teacher encoders as a part of a teacher network configured to perform an image reconstruction task based on learned knowledge obtained by the teacher encoder, and transferring the learned knowledge of the teacher encoder of each of the one or more teacher networks to the inference encoder.

According to various embodiments, the method may further include any one of the following features or any technically-feasible combination of some or all of the features:

the inference network learning process includes minimizing a difference between parameter values of the inference encoder and at least one of the one or more teacher encoders;

the inference encoder and the at least one decoder form a student network, wherein the teacher network is configured to reconstruct a clean version of an image without degradations, and wherein the student network is configured to generate a clean version of a degraded image;

the one or more teacher encoders is a plurality of teacher encoders, wherein each of the plurality of teacher encoders is used as a part of one of a plurality of teacher networks, wherein a first teacher network of the plurality of teacher network is directed to a first degradation removal task, and wherein a second teacher network of the plurality of teacher network is directed to a second degradation removal task that is for addressing a different degradation than a degradation addressed by the first degradation task;

the degradation addressed by the first degradation task is flare suppression, and wherein the degradation addressed by the second degradation task is noise removal;

the at least one decoder includes a first decoder for lens flare suppression and a second decoder for noise removal;

the student network and/or the teacher network are configured to take RAW image data as input and generate processed image data as output; and/or the inference encoder includes two or more convolutional blocks, and wherein at least one convolutional block of the two or more convolutional blocks includes at least two independent processing pipelines with each being for processing RAW data of a different channel.

According to another aspect of the disclosure, there is provided a method of training a machine learning (ML) based image signal processing (ISP) model. The method includes: obtaining a plurality of image training data entries; training a teacher encoder using the plurality of image training data entries through use of a teacher training process to obtain learned knowledge; and transferring the learned knowledge of the teacher encoder to an inference encoder through an inference network learning process that includes adjusting parameter values of the inference encoder based on parameter values of the teacher encoder. Each image training data entry of the plurality of image training data entries includes degraded image data and clean image data. The degraded image data represents a degraded version of a training image, and the clean image data represents a clean version of the training image. The teacher training process includes, for each image training data entry of the plurality of image training data entries: inputting the clean image data of the image training data entry into the teacher encoder to obtain clean latent feature data; generating reconstructed clean image data using a teacher decoder that takes, as input, the clean latent feature data and outputs the reconstructed clean image data; and adjusting parameters of the teacher encoder using the clean image data and the reconstructed image data whereby the parameters of the teacher encoder embody learned knowledge.

According to various embodiments, the method may further include any one of the following features or any technically-feasible combination of some or all of the features:

the degraded version of the training image includes one or more lens' flares and/or noise;

as a part of the inference network learning process, the inference encoder is considered a part of a student network configured to generate a clean version of a degraded image;

the inference encoder includes a plurality of convolutional blocks, and wherein each convolutional block includes one or more convolution operations that are performed on data of a different channel;

the inference encoder includes at least three independent processing pipelines, each of which is for one of three color channels;

the three color channels correspond to red (R), green (G), and blue (B);

the degraded image data for each training data entry of the plurality of training data entries is generated based on inputting a clean processed image into a reverse image signal processing (ISP) pipeline that generates degraded RAW image data as the degraded image data for the training data entry;

a flare degradation is introduced prior to mosaicing of image data in order to generate the degraded RAW image data; and/or noise is introduced after mosaicing of the image data in order to generate the degraded RAW image data.

According to yet another aspect of the disclosure, there is provided an image enhancement processing system. The image enhancement processing system includes: a computer subsystem communicatively coupled to an image sensor so as to receive sensor data therefrom and having at least one processor and memory storing computer instructions that, when executed by the at least one processor, cause the image enhancement processing system to: obtain image data representing an image and generate enhanced image data representing an enhanced image based on performing inference for a machine learning model. The machine learning model has an inference encoder configured to generate latent image feature data based on the image data and at least one decoder configured to receive the latent image feature data from the inference encoder. Knowledge is imparted into the inference encoder from one or more teacher encoders as a result of a knowledge transfer training process. The knowledge transfer training process includes: training each of the one or more teacher encoders as a part of a teacher network configured to perform an image reconstruction task based on learned knowledge obtained by the teacher encoder, and transferring the learned knowledge of the teacher encoder of each of the one or more teacher networks to the inference encoder.

According to various embodiments, the image enhancement processing system may further include the image sensor, and the image data may be obtained from the image sensor as RAW image data. Further, according to an embodiment, a vehicle subsystem is provided, the vehicle subsystem having vehicle electronics that include the image sensor and the image enhancement processing system. The image enhancement processing system may be configured to perform any one or more of those operations or steps listed above, and/or may otherwise be configured according to such listed features.

BRIEF DESCRIPTION OF THE DRAWINGS

Preferred exemplary embodiments will hereinafter be described in conjunction with the appended drawings, wherein like designations denote like elements, and wherein:

FIG. 2 is a flowchart illustrating a method of enhancing an image using a machine learning model, according to one embodiment;

FIG. 3 is a flowchart illustrating a method of transferring learned knowledge from a teacher encoder to an inference encoder, according to one embodiment;

FIG. 4 is a flowchart illustrating a method of training a teacher encoder, such as the teacher encoder of FIG. 3, according to one embodiment;

DETAILED DESCRIPTION

Figure 1:
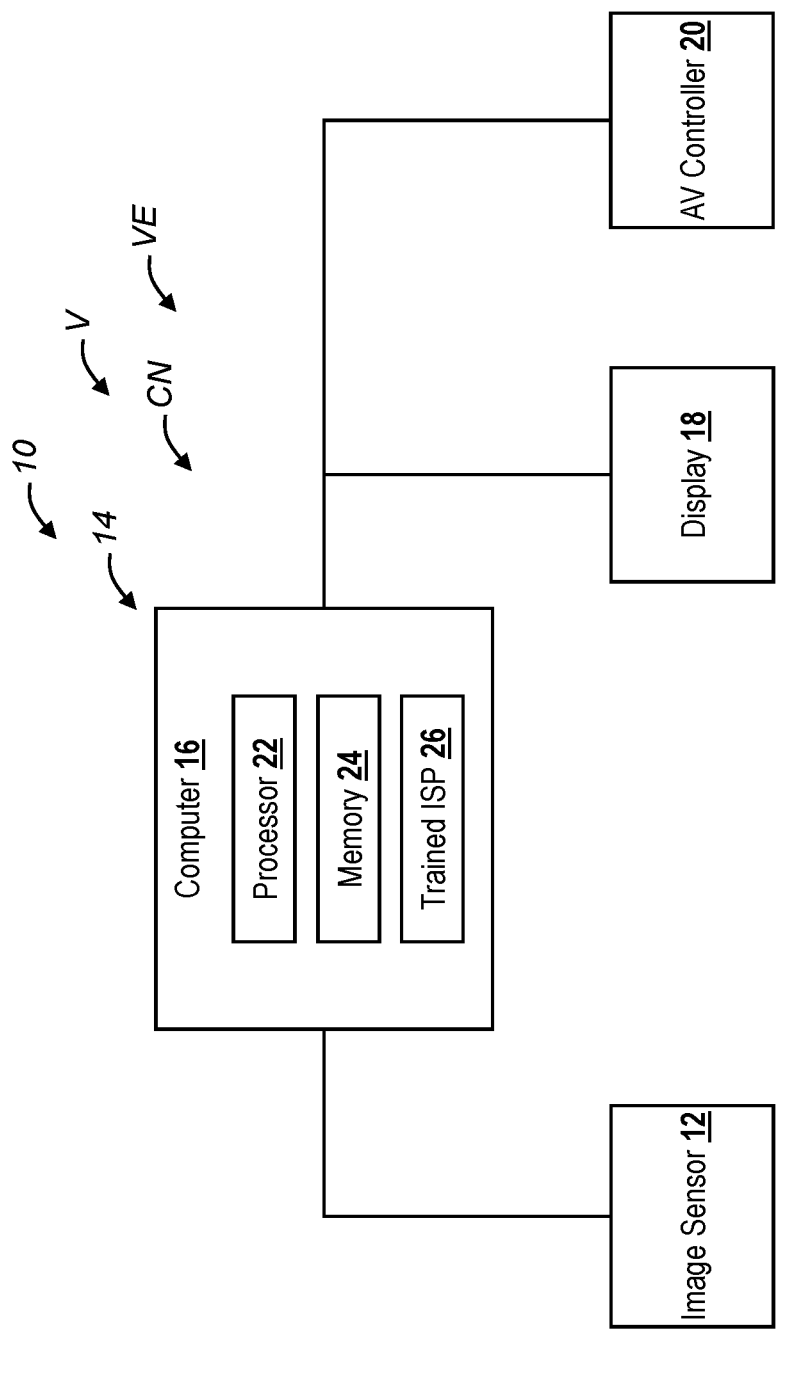
FIG. 1 is a block diagram illustrating an image enhancement system, according to one embodiment.

A system and method is provided for removing visual degradations within an image, namely light flares and noise, in order to generate an enhanced image, which refers to a version of the image without the degradations or at least with the degradations having been mitigated. Image signal processing is performed, particularly, inference of a convolutional neural network (CNN) is performed whereby an encoder (or "inference encoder") receives an input image and generates latent feature data that is then used by a decoder to generate the enhanced image. The CNN here is a trained machine learning (ML) model (or, more particularly, a trained CNN), and this trained ML model is trained using a knowledge transfer training process, which is described below.

As discussed above, alterations in scene illumination and lens configurations can significantly compromise the performance of learning-based ISPs. In order to address this, foundational principles of ISP were revisited, and the scope of ISP was expanded to encompass both flare suppression and noise removal. This approach aims to cultivate a robust ISP resilient to illumination variations and lens degradation. At least according to embodiments, these functionalities are integrated within the ISP framework rather than employing them as post-processing steps. This is rooted in the notion that the RAW space inherently offers higher information depth and a linear representation compared to the non-linear sRGB space, optimized for human perception. Leveraging established end-to-end ISP designs facilitates seamless integration of these functionalities, eliminating the need for intricate handcrafted image processing operations and ensuring diversity in the training samples.

It is notable that incorporating the noise removal/suppression into the ISP seeks to address challenges presented by intricate noise distributions often observed in the automotive setting. In embodiments, a synthetic noise generation mechanism or process is used. This mechanism is seamlessly integrated with a region-based augmentation technique, facilitating the creation of diverse noise distributions within the input training images. The motivation behind this approach is to fortify the underlying learning-based ISP system against the diverse noise patterns stemming from nonuniform illumination and sensor variations. The effectiveness of the proposed methodology was validated through rigorous ablation studies, underscoring its significance in achieving robustness in handling distinct noise encountered in real-world automotive settings.

In terms of flare removal/suppression, current mechanisms predominantly concentrate on flare removal, a strategy unsuitable for automotive settings as it modifies the original image. Instead of complete flare removal, the system and method herein aims to suppress flare while retaining the illumination source, at least in embodiments. This nuanced strategy ensures the elimination of flares without compromising the fundamental image structure. In the context of automotive scenarios, where computational constraints are often important, a lightweight CNN architecture, termed lightweight ISP (LISP), may be used. This architecture is specifically designed for deployment in edge devices, providing high-resolution, low-latency ISP functionality, addressing computational limitations in real-time applications.

In embodiments, in order to further improve the performance of the student network, instead of using a single general-purpose teacher network that is computationally complex and is expected to have robust performance in multiple diverse conditions, task-specific teacher networks are used in order to generate latent representations in multiple diverse conditions corresponding to input constraints, enabling more streamlined training. For example, if the input image has a flare component (which may be known in embodiments where it is synthetically generated) then a flare removal teacher network is used. Such selective usage of task-specific teacher networks is aimed to improve both student performance while reducing training time since such teacher networks are smaller in size and more generalizable to images outside training distribution.

With reference to FIG. 1, there is shown an image enhancement system 10 for a vehicle having an image sensor (e.g., camera or other visible light sensor) 12, a processing subsystem 14 having at least one computer 16, a display 18, and an autonomous vehicle (AV) controller 20. The image enhancement system 10 is incorporated into vehicle electronics VE of a vehicle V, as shown in FIG. 1. The components 12-20 communicate using an in-vehicle communications network CN, which is implemented by the vehicle electronics VE and may correspond to a controller area network (CAN) bus or wireless local area network (WLAN) connection, for example. Although the image enhancement system 10 of the present embodiment is incorporated into a vehicle, in other embodiments, the image enhancement system 10 may be incorporated into another device, component, or system, such as a non-automotive or non-vehicular system, for example, in a smartphone. The display 18 and the AV controller 20 receive enhanced image data from the processing subsystem 14, but need not be included in other embodiments, and may be excluded or replaced with other components to which enhanced image data is provided.

The image sensor 12 is a sensor that captures light (namely, visible light in the present embodiment) represented as an array of pixels that together constitute a light image or a visible light image in the present embodiment, which may be represented as RAW data in the form of RGBG Bayer raw data, for example. The image sensor 12 captures and represents a scene using a visible light color space or domain, such as RGB. According to embodiments, the image sensor 12 is a digital camera, such as one employing a CMOS (Complementary Metal-Oxide-Semiconductor) sensor, CCD (Charge-Coupled Device) sensor, or a Foveon sensor, and is used to generate RAW sensor data that is passed to an ISP pipeline for processing.

The image sensor 12 captures visible light images representing a scene as viewed from the sensor's point of view. More particularly, the image sensor 12 receives light, which is then converted from its analog representation to a digital representation. Various processing techniques may be used to prepare the visible light image for downstream processing, including, for example, demosaicing, color space conversion, and other image processing techniques, such as image enhancement techniques (e.g., color balance, exposure, sharpness). Such processing results in the captured light represented as a visible light image in a visible light color space, such as standard RGB (sRGB) or Adobe™ RGB, for example.

The processing subsystem 14 is for processing images captured by the light sensor 12 in order to generate an enhanced version of the captured images. The processing subsystem 14 is configured to perform the method discussed herein, and is configured to do so through executing computer instructions. The processing subsystem 14 includes the at least one computer 16. In FIG. 1, the at least one computer 16 is illustrated as a single computer; however, it will be appreciated that multiple computers may be used as the at least one computer 16, together configured to perform the method and any other functionality attributed to the processing subsystem 14, as described herein. Each of the at least one computer 16 includes the at least one processor 22 and memory 24, with the memory 24 storing the computer instructions for execution by the at least one processor 22. It will also be appreciated that the computer instructions may be stored on different physical memory devices and/or executed by different processors or computers of the processing subsystem 14, together causing performance of the method and attributed functionality discussed herein. Also, although the at least one computer 16 is shown as being separate from the AV controller 20, in other embodiments, the AV controller 20 is implemented using the at least one computer 16.

In one embodiment, the at least one processor 22 includes a central processing unit (CPU) and a graphics processing unit (GPU) (or even a tensor processing unit (TPU)), each of which is used to perform different functionality of the processing subsystem 14. For example, the GPU is used for inference of neural networks (or any like machine learning models) as well as for any training, such as online training carried out for adaptable learning carried out after initial deployment; on the other hand, other functionality attributed to the processing subsystem 14 is performed by the CPU. Of course, this is but one example of an implementation for the at least one computer 16, as those skilled in the art will appreciate that other hardware devices and configurations may be used, oftentimes depending on the particular application in which the at least one computer 16 is used.

The at least one computer 16 is shown as including a trained ISP pipeline (also referred to as a trained inference model) 26, which is stored as computer instructions on the memory 24 and executed by the processor 22. The trained ISP pipeline or trained inference model 26 is used to process an input image in order to enhance the input image, such as to remove degradations, for example, suppressing flare streaks and removing/mitigating noise. The trained inference model 26 includes an inference encoder and at least one inference decoder, each having a plurality of convolutional layers forming a CNN. The CNN may be a lightweight CNN thereby providing a lightweight ISP pipeline, as discussed more below. The trained inference model 26 may be trained using a training subsystem (not shown) having one or more computers. In embodiments, knowledge transfer is performed whereby the inference encoder, acting in a role here as a student, learns or is otherwise imparted knowledge learned by one or more teacher encoders through a clean-image feature extraction process.

With reference to FIG. 2, there is shown a method 200 of enhancing an image using a machine learning model. The method 200 is performed by the image enhancement system 10, according to one embodiment.

The method 200 begins with step 210, wherein image data is obtained. The image data is captured using the image sensor 12. The image sensor 12 may continuously capture visible light images that are then processed and/or stored in memory of the system 10. The visible light sensor 12 captures visible light information of a scene within the FOV of the visible light sensor 12. The visible light image is obtained at the at least one computer 16 and may be processed using various techniques, such as image enhancement techniques. The method 200 continues to step 220.

In step 220, inference is performed using a machine learning model to generate enhanced image data representing an enhanced image. For example, the trained inference model 26 is used to perform inference in order to generate the enhanced image data. The machine learning model is a CNN that includes a plurality of convolutional layers and, in embodiments, includes a plurality of convolutional encoder layers constituting an inference encoder and a plurality of convolutional layers forming an inference decoder that takes, as input, latent feature data generated by the inference encoder. The image data, which may represent an entire visible light image captured by a camera, is input into the CNN in order to begin inference, which results in the inference decoder generating enhanced image data representing an enhanced image. The CNN is trainable and is a lightweight CNN that implements an ISP pipeline incorporating noise and flare suppression/removal, and may be referred to as a lightweight ISP or "LISP". As used herein, "lightweight", when used in connection with an ISP pipeline for processing an input image, refers to processing at least two color channels separately from one another from RAW input image data for a given channel before transforming input image data into processed image data, akin to data having had a space-to-depth/demosaicing performed. And, as used herein, "lightweight", when used in connection with a CNN implementing an ISP pipeline for processing an input image, refers to processing at least two color channels separately from one another whereby, for each RAW channel of the at least two color channels, the CNN receives RAW image data for the RAW channel and, as a result of the ISP branch for that channel, generates an output for a channel for a predetermined color space, such as red (R) of the RGB color space. At the end of the LISP, the branched channels are merged using a space-to-depth operation. As used herein, a "parallel ISP" refers to an ISP with an ISP pipeline in which parallel processing is performed with respect to at least two channels, such as two color channels (e.g., red (R) and green (G)); and, in embodiments, three color channels, such as red (R), green (G), and blue (B), are processed concurrently. An example of a LISP and its related components are discussed below. The method 200 continues to step 230.

In step 230, the enhanced image data is stored in memory and/or communicated or otherwise provided to another computer or other electronic device, such as the display 18 or the AV controller 20. In embodiments, the enhanced image data is stored the memory 24 and/or another memory of the vehicle electronics VE. In some embodiments, the method 200 is performed continuously, such as through capturing image data and, in real-time, processing the captured image data in order to generate enhanced image data for the captured images. The enhanced image data may be displayed on the display 18 for viewing by the driver or other passenger, or may be continuously used for autonomous processing (e.g., for determining autonomous maneuvers) by the AV controller 20, for example. The method 200 then ends.

With reference to FIG. 3, there is shown a method 300 of transferring learned knowledge from a teacher encoder to an inference encoder, thereby generating a trained inference model. The method 300 is performed by a ML training computer system (not shown), according to one embodiment, and the ML training computer system includes at least one processor and memory storing computer instructions that, when executed by the at least one processor, cause the method 300 to be performed.

The method 300 begins with step 310, wherein training data is obtained. The training data includes a plurality of training data entries, where each training data entry includes degraded image data and clean image data. The degraded image data represents a degraded version of a training image, and the degraded version of the training image includes one or more flares and/or noise. The clean image data represents a clean version of the training image. The method 300 continues to step 320.

In step 320, a teacher encoder is trained using the training data. The teacher encoder is an encoder formed of a plurality of CNN layers in the present embodiment, and is used to generate latent feature data based on an input image, particularly, a clean input image. The teacher encoder uses a predetermined framework having a plurality of convolutional layers. The teacher encoder is separate than the inference encoder (see step 220 of the method 200), but has the same architecture or framework in that the teacher encoder and the inference encoder both use the same structure of convolutional neural network.

With reference to FIG. 4, a process 400 for training a teacher encoder is shown, according to one embodiment. The process 400 begins with step 410, wherein clean image data is input into the teacher encoder to obtain clean latent feature data. Then, at step 420, reconstructed clean image data is generated using a teacher decoder based on the clean latent feature data. The process 400 continues to step 430, wherein parameters of the teacher encoder are adjusted based on loss calculated using the reconstructed image data output by the teacher decoder and the clean image data. The process 400 is continued until training is complete. An exemplary process for training of the teacher encoder is described below with reference to FIG. 6. The method 300 continues to step 330.

In step 330, learned knowledge is transferred from the teacher encoder to an inference encoder (or student encoder). The training of the teacher encoder is performed with respect to an image reconstruction task, which is performed on a clean RAW image. The teacher encoder generates clean latent feature data that is representative of the image to be reconstructed such that it enables the teacher decoder to accurately reconstruct the image. The clean latent feature data is used for training the student encoder. The method 300 ends.

Although the method 300 is described in connection with transferring knowledge from a teacher encoder to an inference encoder, the method 300 may be used multiple times, such as for imparting knowledge to the inference/student encoder from each of a plurality of teacher encoders, which is effected through execution of the method 300 for each teacher network. In embodiments, a first teacher network of the plurality of teacher network is directed to a first degradation removal task, such as flare suppression, and a second teacher network of the plurality of teacher network is directed to a second degradation removal task that is for addressing a different degradation than a degradation addressed by the first degradation task, such as noise removal for the second degradation removal task.

Figure 5:
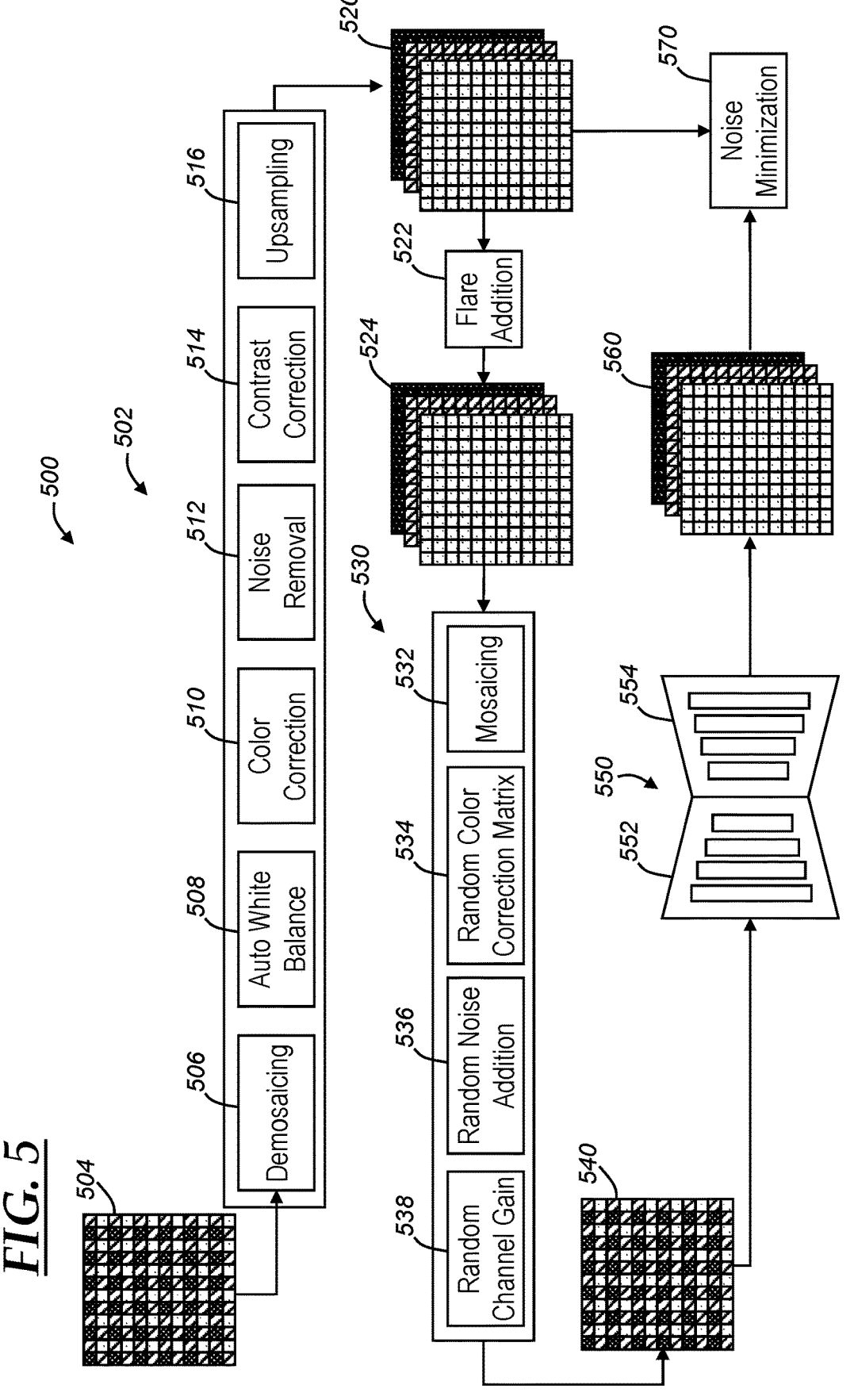
FIG. 5 is a block diagram depicting an image signal processing (ISP) pipeline that implements one or more steps of one or more of the method discussed herein, according to embodiment.

With reference to FIG. 5, there is shown an image signal processing (ISP) training pipeline 500 including an ISP pipeline 502 that takes a RAW input image 504 as input and generates a processed image 520 having been demosaiced and in a predetermined color space, such as RGB, having three channels as shown in the depicted embodiment. In the depicted embodiments of FIGS. 5 and 6, it will be appreciated that the black-dotted-with-white-background squares represent a red (R) pixel, the slashed squares represent a green (G) pixel, and the white-dotted-with-black-background squares represent a blue (B) pixel; this depicts an example using RGGB or RGBG RAW image data (see RAW input image 504, RAW image data 540), which is divided into a red, green, and blue channel for each pixel as shown in the processed image 520. After the processed image 520 is generated using the ISP 502, the processed image is considered a clean image in that it does not have degradations (or minimal/negligible ones) and is processed in that it is demosaiced into a color space. The clean processed image 520 has flare degradations added to it, as shown at flare addition operation 522. This results in a degraded processed image 524, which is then passed into a reverse ISP 520.

The reverse ISP pipeline 530 takes the processed image 524 as input and generates a RAW image (RAW image data) 540, which is then used as input into a CNN 550. The clean processed image 520 may also be converted into a clean RAW image, through use of mosaicing 532, although flare and noise addition are not performed on the clean processed image 520 in order to generate the clean RAW image, which may be used to train a teacher encoder, as discussed below with respect to FIG. 6. The CNN 550, corresponding to the ML-based ISP being trained, generates an output or enhanced image 560. This image 560 output by the CNN 550 is then compared with the clean processed image 520 to minimize noise and backpropagation is used to train the CNN 550.

The CNN 550 includes an encoder 552 and at least one decoder 554, and this CNN 550 corresponds to an inference model that is used during inference, after the CNN 550 is suitably trained, in order to generate enhanced processed image data based on RAW degraded image data. In such a scenario, the encoder 552 is an inference encoder and the at least one decoder 554 are each an inference decoder, such as a first decoder that suppresses flare streaks and other associated flare degradations and a second decoder that removes noise. The outputs of the decoders may be combined and, optionally, local color correction may be performed, as discussed below.

In embodiments, a first decoder of the at least one decoder 554 is used for flare suppression, and another decoder of the at least one decoder 554 for noise removal. These two degradations are discussed below.

Typical nighttime lens flares, i.e., scattering flare and reflective flare, are complex as they comprise many components including halos, streaks, irises, ghosts, bright lines, saturated blobs, haze, glare, shimmer, sparkles, glint, spike balls, rings, hoops, and caustic. In visual effects (VFX), computational photography, optics, and photography, an identical type of components may have different names. To avoid confusion, these names are grouped herein into several common types based on their patterns. For instance, sparkles, glint, and spike balls are all radial line-shaped patterns. Herein, "shimmer" is used to represent all these types of radial line-shaped components. To facilitate a better understanding, the formation principle of each type of nighttime lens flare is discussed as follows.

Figure 10B:
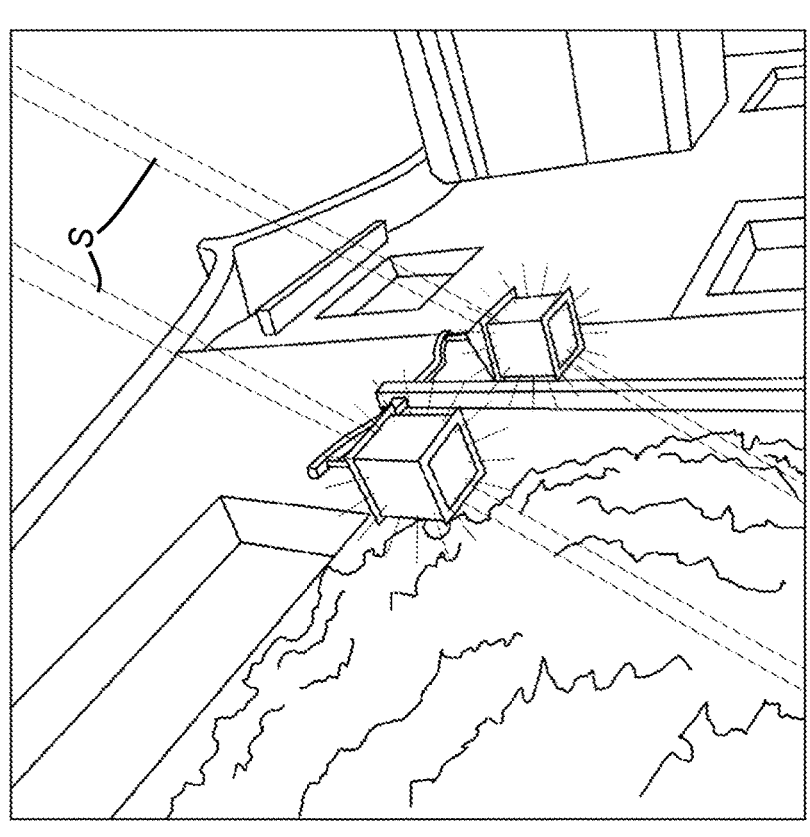
FIGS. 10A-10B depict an example of a clean image (FIG. 10A) and a degraded image (FIG. 10B), which are versions of the same scene.
Figure 10A:
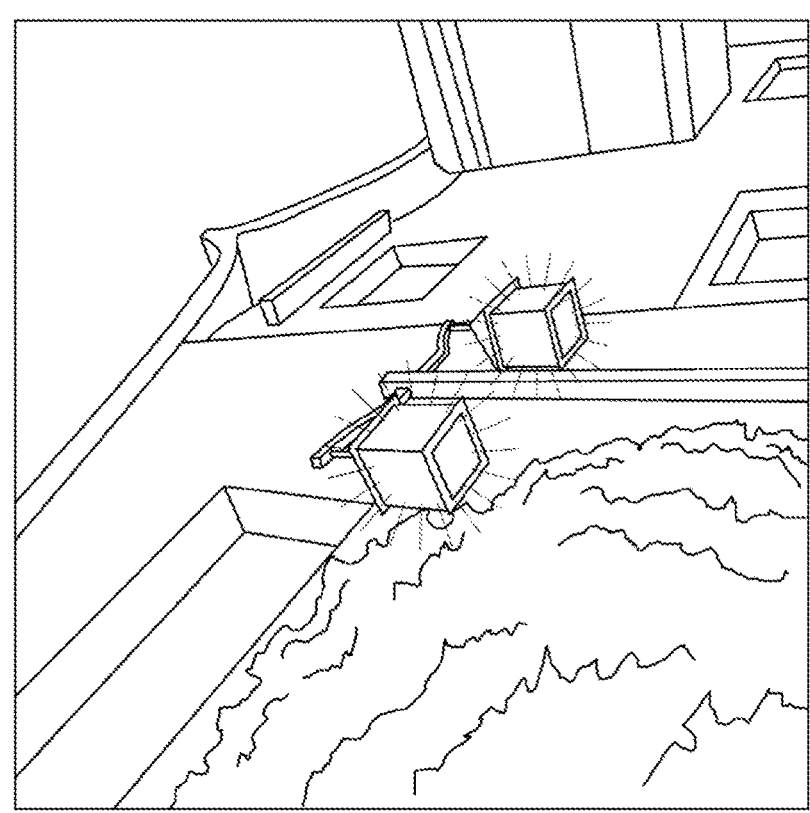

Scattering Flare. The common components in scattering flares can be divided into glare, shimmer, and streak. Glare is a smooth haze-like effect around the light source, also known as the glow effect. Even in an ideal lens system, the pupil with a limited radius will still function as a low pass filter, resulting in a blurry light source. Moreover, abrasion or dotted impurities in the lens will lead to the lens' uneven thickness, noticeably increasing the area of the glare effect. Besides, dispersion makes the hue of the glare not globally constant. As shown in FIG. 10B, flare streaks S extend from the light source from one end to another in the image. In one example, pixels of the flare streak or glare far away from the light source are bluer than the pixels around the light source. During daytime with sufficient illumination, the scene around the light is bright enough to cover the glare effect. However, in a low-light condition, the glare is significantly brighter than the scene, hence cannot be ignored for nighttime flare removal.

Shimmer (a.k.a., sparkles, glint, spike balls) is a pattern with multiple radial stripes caused by the aperture's shape and line-shaped impurities and lens defects. Due to the structure of the aperture, the pupil is not a perfectly round, thus producing a star-shaped flare. Taking the dodecagon-shape aperture as an example, diffraction around the edge of the aperture projects a point light source to a dodecagram on the photo. Different from the aperture, line-shaped lens defects always lead to uneven shimmer. For the lens flare in the daytime, as a light source with high intensity, the sun will leave bright shimmers over the whole screen. In contrast, the intensity of the artificial light is lower and the area of the shimmer is always similar to the glare effect. Because shimmer is only different from glare in terms of pattern, it can also be viewed as a high-frequency component of the glare.

Streaks (a.k.a., bright lines, stripes) are line-like flares that are significantly longer and brighter than shimmer, and these streaks often appear in smartphone photography and night-time driving videos. Oriented oil stains or abrasion on the front lens may act as grating and cause beam-like point spread functions (PSF). During the daytime, streaks are just like brighter shimmer. However, in a low-light condition, even a light source with low intensity may generate streaks across the whole screen. Because one cannot always keep a smartphone's lens or vehicle-mounted camera clean, this phenomenon is conspicuous at nighttime.

Reflective Flare. Reflective flares (a.k.a., ghosting) are caused by reflection in multiple air-glass lens surfaces. For a lens system with m optical surfaces, even if the light is exactly reflected twice, there are still m(m−1)/2 kinds of combinations to choose two surfaces from m surfaces. Generally speaking, the reflective flares form a combination of different patterns like circles, polygons, or rings on the image. Due to multiple reflections between lenses, it is challenging to synthesize reflective flares in physics. To simulate reflective flares, a more straightforward method is to use 2D approaches. Specifically, for 2D reflective flare rendering, because the hoop and ring effect caused by dispersion is not apparent at night, the reflective flare may be abstracted as a line of different irises. During the process of reflection, if the light path is blocked by the field diaphragm, this would result in a clipping iris. In 2D approaches, this effect can be simulated by setting a clipping threshold for the distance between the optical center and the light source. If this distance is longer than the clipping threshold, parts of the irises would be clipped proportionally. It may be ideal to add each iris to the image independently. Moreover, there will not be interference between different irises. However, in real-world scenes, the neighboring rays are often correlated and generate triangle mesh. To avoid blocking artifacts, Ernst et al. (Ernst, Manfred & Akenine-Möller, Tomas & Jensen, Henrik. (2005). *Interactive rendering of caustics using interpolated warped volumes.* GI '05: Proceedings of Graphics Interface 2005. 87-96. 10.1145/1089508.1089523) proposed a way for caustics rendering and introduced a technique for combining and interpolating these irises. According to one embodiment of the disclosed method, because rendering physically realistic caustics increases the difficulty of simulating reflective flare, specific caustics patterns are used to simulate this effect.

As mentioned above, the flare addition 522 is performed on the processed image as synthetic generation of flare is tailored for RGB space. According to the depicted embodiment, after initially incorporating flare into the RGB image, the reverse ISP pipeline 530 is employed to transform the augmented RGB image into a RAW image, onto which noise is later introduced. It is noted that, according to at least some embodiments, the reverse ISP pipeline 530 is inherently crafted for a specific ISP, leading to a one-to-one mapping. To introduce diversity akin to different imaging sensors, variations, such as random channel gain and a random color correction matrix, are introduced. These variations are strategically incorporated to synthetically emulate the nuances associated with different imaging sensors, thereby enhancing the robustness and versatility of the generated synthetic data.

Noise Generation The mathematical formulation of the image denoising degradation model is expressed as $y=x+n$, where n represents the noise to be removed. Recent advancements in image denoising have seen the dominance of deep neural networks. Researchers aiming to enhance deep image denoising focus primarily on two directions. The first direction aims to improve performance under the assumption that noise n is additive white Gaussian noise (AWGN). The second direction emphasizes training data or noise modeling. Both directions contribute to the overarching goal of enhancing the practicality for real images. While AWGN is a widely-used assumption due to its mathematical convenience, it is acknowledged that models trained solely with AWGN assumptions may perform sub-optimally for most real images due to noise assumption mismatches.

Gaussian Noise. Additive white Gaussian noise (AWGN) is a prevalent assumption for denoising, modeling the real noise of an image sensor. However, it often does not align with real noise characteristics, potentially compromising the practicality of trained deep denoising models. Despite this, studies show that models trained with AWGN, such as FFDNet (K. Zhang, W. Zuo and L. Zhang, "FFDNet: Toward a Fast and Flexible Solution for CNN-Based Image Denoising," in IEEE Transactions on Image Processing, vol. 27, no. 9, pp. 4608-4622, September 2018, doi: 10.1109/TIP.2018.2839891), can remove non-Gaussian noise by adjusting the Gaussian noise level. To address this, a 3D generalized zero-mean Gaussian noise model with a 3×3 covariance matrix is adopted, considering noise correlation between R, G, and B channels. This model accounts for the color image demosaicing step in the camera ISP pipeline, which can correlate noise across channels. The noise levels are sampled from 2/255, 3/255, . . . 50/255, with grayscale Gaussian noise chosen to model remaining noise, having probabilities of 0.4, 0.4, and 0.2 for the two extreme cases and the general case, respectively.

Poisson Noise. Poisson noise, originating from the discrete nature of electric charge, is signal-dependent and prevalent in low-light conditions. Traditional model-based methods often transform Poisson noise into an approximate signal-independent form for further processing. However, such methods require prior knowledge of the noise type, which is generally unavailable for real images. Here, it is proposed to directly remove Poisson noise through a deep model. Different noise levels are sampled by multiplying the clean image by 10, where is uniformly chosen from [2,4], and then dividing back by 10 after adding the signal-dependent Poisson noise. This process is mathematically modeled as nP(10×)/10×, where U(2,4). Grayscale Poisson noise is also considered by converting the clean color image into a grayscale image.

Speckle Noise. Speckle noise, typical in coherent imaging systems, is modeled as multiplicative noise through the multiplication of the latent clean image and Gaussian noise. This strategy modifies the Gaussian noise synthesis approach.

JPEG Compression Noise. JPEG compression introduces blocking artifacts with the increase of compression degree, controlled by the quality factor ranging from 0 to 100. To simulate this noise, the quality factor from [20,95] may be uniformly sampled.

Processed Camera Sensor Noise. The noise in output RGB images of modern digital cameras is caused by passing read and shot noise in raw sensor data through an image signal processing (ISP) pipeline. This noise may be synthesized by generating raw images from clean images via the reverse ISP pipeline and then processing the noisy raw image via the forward ISP pipeline after adding read and shot noise to the raw image.

Resizing. Image resizing, a fundamental digital image editing tool, can affect the noise distribution of images. To model resizing-induced noise, the widely-used bilinear and bicubic resizing operations are applied, choosing the scaling factor from [0.5,2]. The same resizing for both the noisy and clean images is used to maintain consistency in spatial resolution. This differs from the super-resolution degradation proposed in Zhang, Kai, et al. "Designing a practical degradation model for deep blind image super-resolution." Proceedings of the *IEEE/CVF International Conference on Computer Vision*. 2021.

Figure 6:
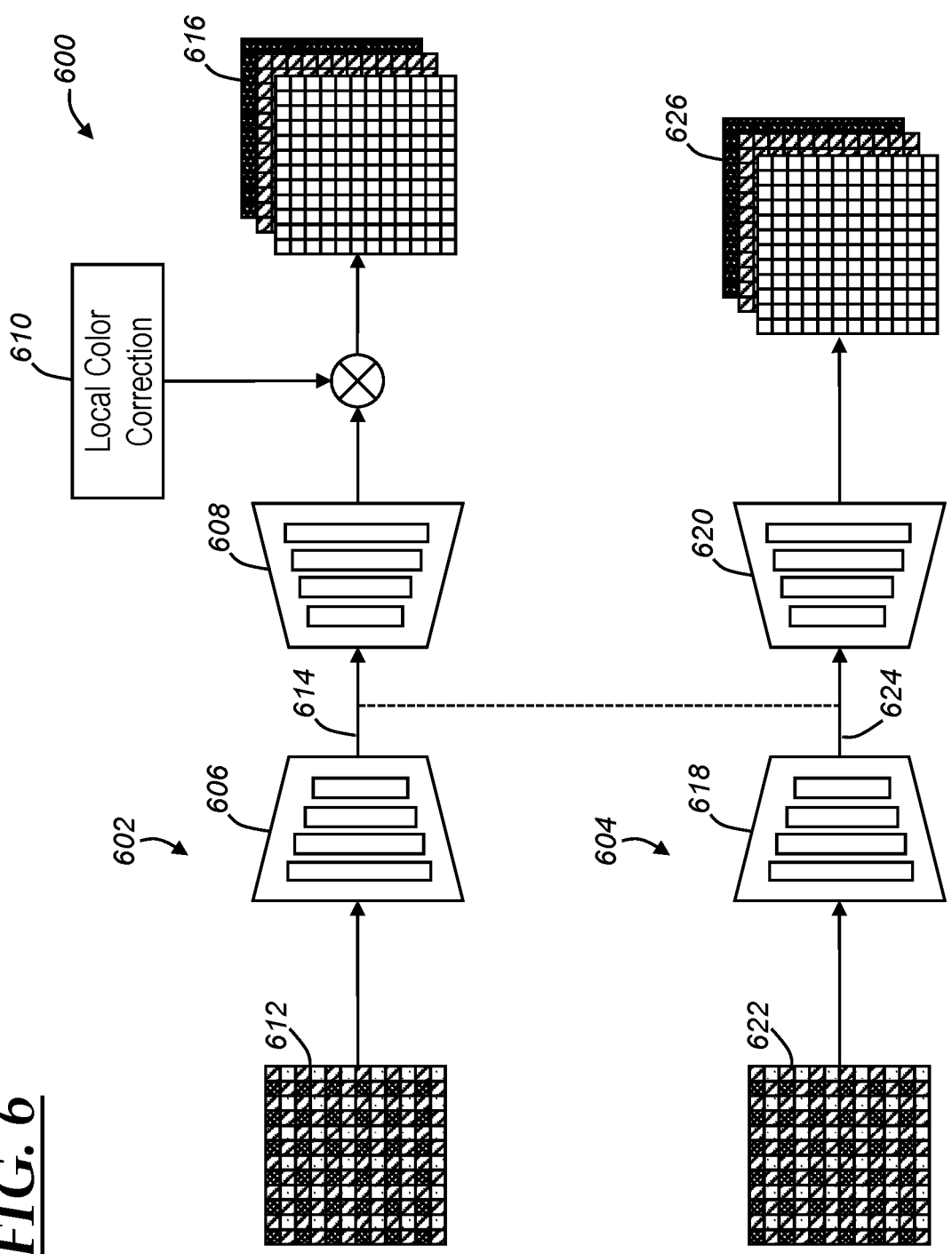
FIG. 6 is a block diagram depicting a knowledge transfer pipeline, including a student network and a teacher network, which may be used to implement the method of FIG. 3, according to one embodiment.

With reference to FIG. 6, there is shown a knowledge transfer pipeline 600, including a student network 602 and a teacher network 604. The knowledge transfer pipeline 600 is used to transfer knowledge from the teacher network 604 to the student network 602. The student network 604 includes a student encoder 606, which may be used as the inference encoder, and one or more student decoders (only one shown) 608, which may be used as inference decoders. Local color correction 610 may also be performed to the output image data of the student decoder(s) 608, and this local color correction may be multiplied (tensor product) with the output of the decoder(s) 608. The student encoder 606 takes degraded RAW image data 612 as input and generates latent feature data 614, which is then input into the one or more student decoders 608, which may receive it and perform processing concurrently with one another (when multiple student decoders 608 are used, such as one for flare suppression and another for noise removal) to generate an enhanced processed image represented by enhanced image data or enhanced processed image data 616. As used herein, the term "processed", when used in connection with image data or image, refers to image data or an image that has gone through a de-Bayering process or other raw image interpolation process, which may depend on the particular image sensor being used.

The teacher network 604 includes a teacher encoder 618 and a teacher decoder 620. The teacher encoder 618 is trained using clean RAW image data 622 as input and, based on this input, the teacher encoder 618 generates clean latent feature data 624, which is passed into a teacher decoder 620 that then reconstructs the clean processed image 626. The clean processed image 626 is then compared with the original processed image, and backpropagation is used to train the teacher network 604 including the teacher encoder 618. The clean latent feature data 624 is used for training the student encoder 606 and, more particularly, the clean latent feature data 624 is used for imparting knowledge into the student encoder, as shown by the dashed line in FIG. 6. The clean latent feature data 624 is compared to the latent feature data 614 and a difference therebetween is minimized in order to direct the parameters of the student encoder 606 towards those that arrive at latent feature data similar or as close to the same as the clean latent feature data 624.

In embodiments, the teacher encoder 618 and the student encoder 606 have the same architecture, and this same-architecture knowledge transfer process involves leveraging latent representations generated by the teacher encoder 618 for training the student encoder 606. The teacher encoder 618, already trained on the specific task of clean image reconstruction, generates latent data representations (represented by the clean latent feature data 624) that encapsulate its learned features and patterns. This latent data 624, rich in information and nuances learned by the teacher, is then used to train the student encoder. The student encoder 606, having the same architectural design as the teacher encoder 618, utilizes this latent data 624 to adapt its weights and biases, effectively learning from the distilled knowledge of the teacher. This method ensures that the student encoder 606 inherits the intricate understanding of the data encapsulated in the latent representations. The student encoder 606, through this training, becomes adept at processing and understanding data in a similar manner to the teacher encoder 618, but with the flexibility to be further fine-tuned for specific tasks or datasets, namely for image enhancement, particularly, flare suppression and noise removal in the present embodiment.

Figure 7:
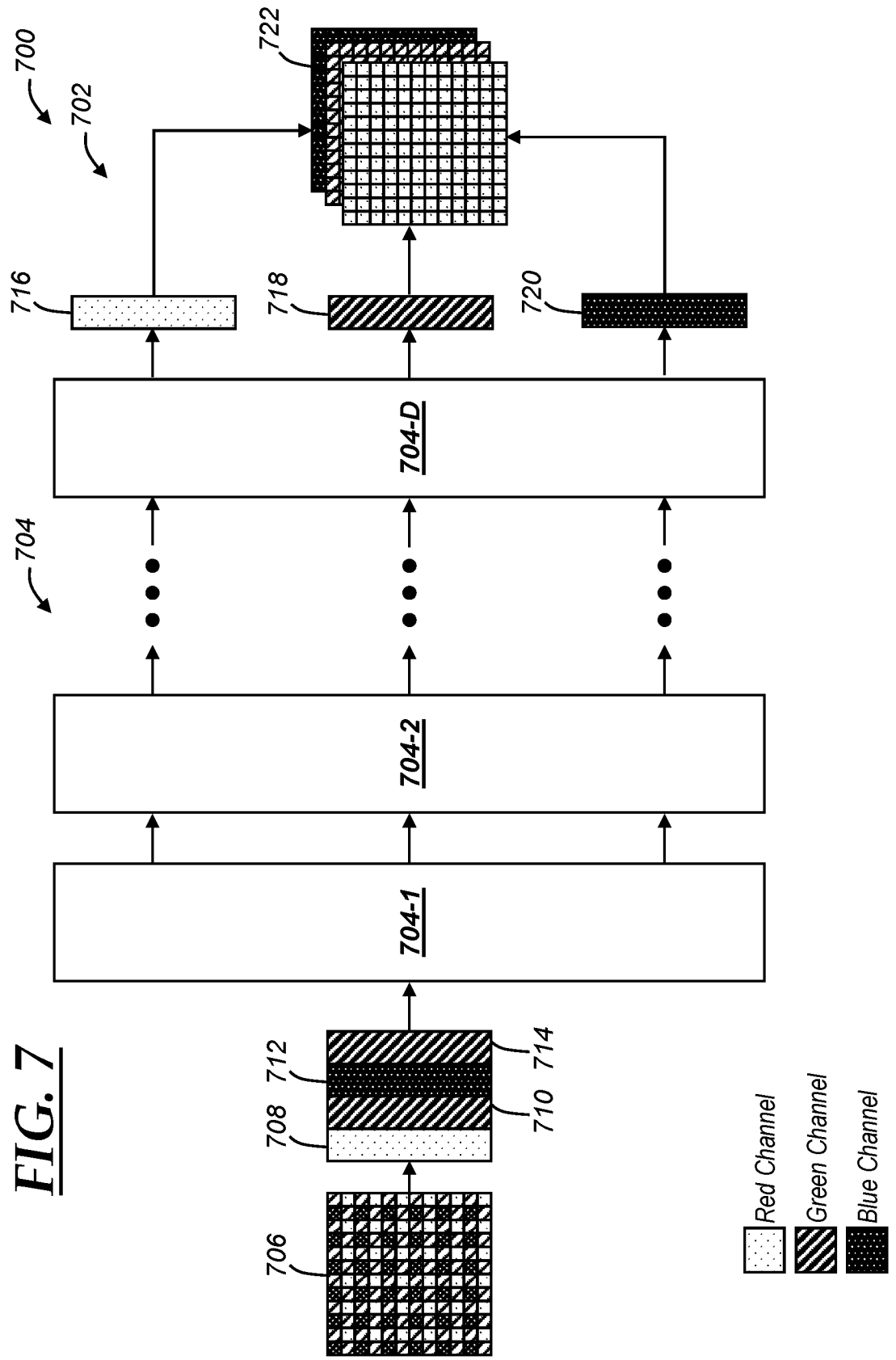
FIG. 7 is a block diagram depicting an ISP pipeline and, more particularly, a lightweight ISP, according to one embodiment.

With reference to FIG. 7, there is shown an ISP pipeline 700 and, more particularly, a lightweight ISP 700 that is trained using the above-described training process. The ISP pipeline 700 includes a convolutional neural network (CNN) 702, which is comprised of a plurality of convolutional blocks 704 (referred to individually as 704-*d*, where d is an integer from 1 to D, denoting an index of a given convolutional block). In embodiments, the convolutional blocks 704 are used for the encoders and decoders, with the encoder being configured for downsampling and the decoders for upsampling. The CNN 702 takes RAW image data 706 in the form of RGBG Bayer data, as represented by red channel 708, green channels 710,714, and blue channel 712. The CNN 702, through D convolutional blocks 704, generates outputs for each channel (as shown by red channel 716, green channel 718, and blue channel 720), which are combined in a depth-to-space layer to form output image or enhanced processed image data 722.

Figure 8:
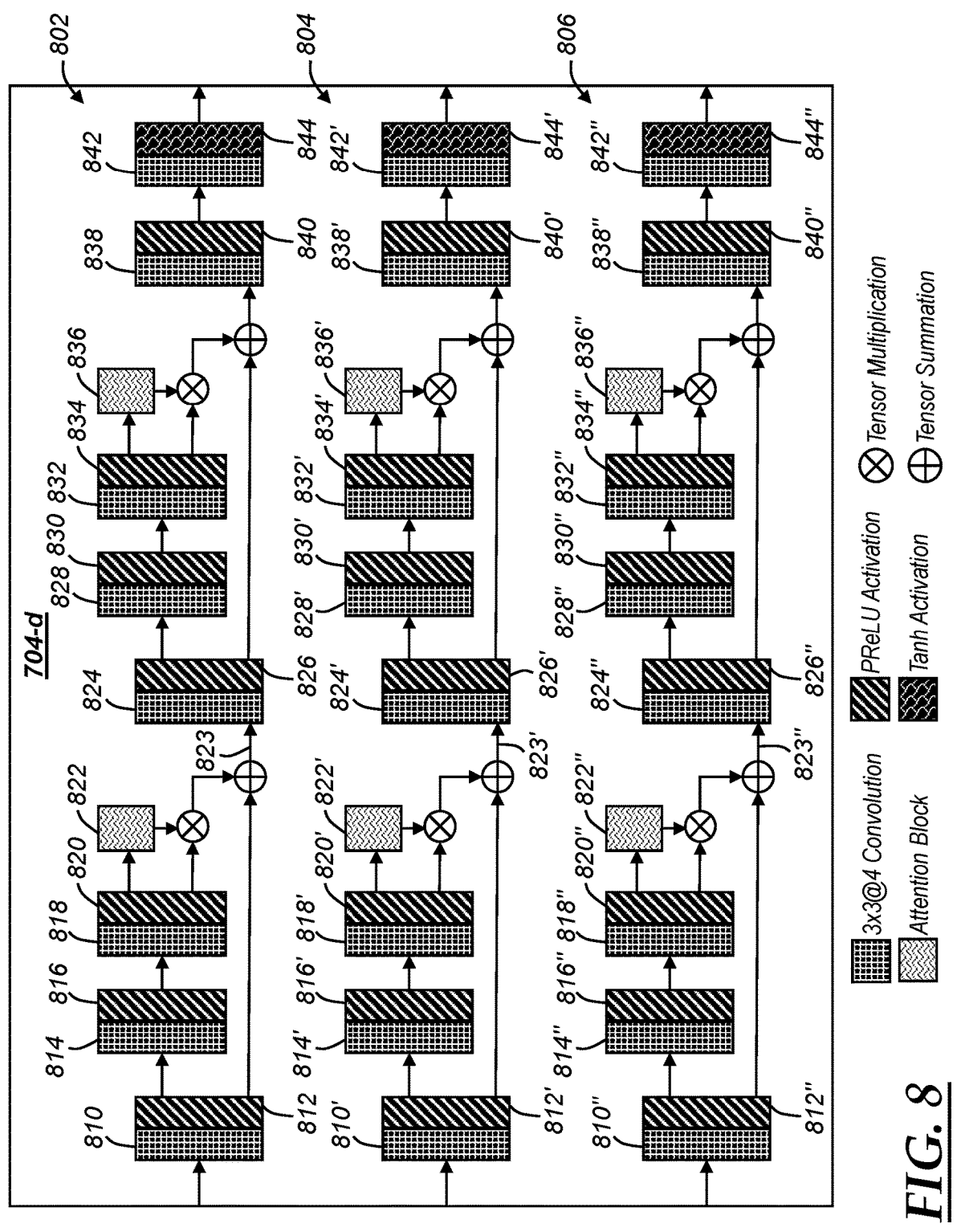
FIG. 8 is a block diagram depicting a convolutional block having a convolutional block architecture that may be used for the teacher encoder, the student encoder, the teacher decoder, and/or the student decoder(s), according to one embodiment.

With reference to FIG. 8, there is shown an embodiment of a convolutional block 704-*d*, which is shown as having three concurrent or asynchronous processing pipelines or processes 802, 804, 806, where one thread is used for a different color channel, with red channel CNN processing 802, green channel CNN processing 804, and blue channel CNN processing 806, as shown in the depicted embodiment of FIG. 8. In the present embodiment, the steps discussed herein for CNN processing 802, 804, 806 for each channel is the same, and includes steps or operations 810-844 for the red channel CNN processing 802, with steps or operations 810'-844' for the green channel CNN processing 804, and steps or operations 810"-844" for the blue channel CNN processing 806. Steps or operations 810-844 will be described and the discussion below is hereby incorporated and attributed to the steps or operations 810'-844', respectively, and to the steps or operations 810"-844", respectively.

The raw red channel data is received and a first convolution operation 810 is performed, whereby a 3×3 filter or kernel used for convolution with four filters. Then, a PreLU activation 812 is performed, and the output is passed into a second convolution operation 814, which performs a 3×3@4 convolution operation as shown in the depicted embodiment, and this is followed by another PReLU activation 816. Output of this second PReLU activation 816 is then passed into a third convolution operation 818, which may perform a 3×3@4 convolution operation, and this is followed by a third PReLU activation 820. Output of this third PReLU activation 820 is passed into an attention block 822, which is described in more detail below with respect to FIG. 9. Output of the attention block 822 is tensor multiplied to output of the third PReLU activation 820 to generate an output 823, which is then tensor summated with output of the first PReLU activation 812, as depicted in FIG. 8.

The output 823 of this tensor summation results in an intermediary output, which is then passed into a fourth convolution operation 824. Then, a PreLU activation 826 is performed, and the output is passed into a fifth convolution operation 828, which performs a 3×3@4 convolution operation as shown in the depicted embodiment, and this is followed by another PReLU activation 830. Output of this PReLU activation 830 is then passed into a sixth convolution operation 832, which may perform a 3×3@4 convolution operation, and this is followed by another PReLU activation 834. Output of this third PReLU activation 834 is passed into an attention block 836, which is described below with respect to FIG. 9. Output of the attention block 836 is tensor multiplied to output of the PReLU activation 834 to generate an output, which is then tensor summated with output of the PReLU activation 826, as depicted in FIG. 8. The output of this tensor summation is then passed into a seventh convolution operation 838, followed by a PReLU activation 840, another convolution operation 842, and finally a tanh activation 844.

Figure 9:
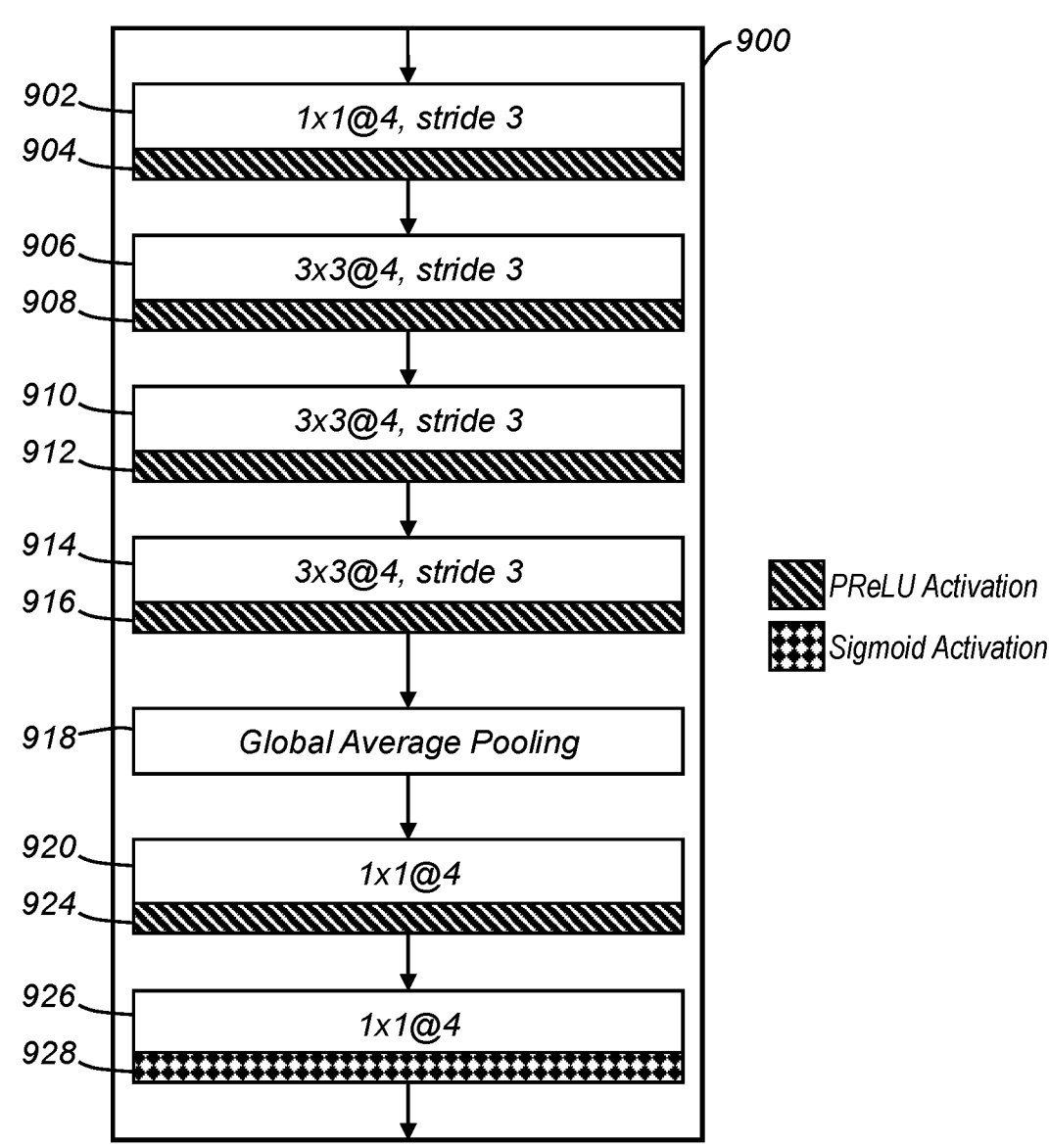
FIG. 9 is a block diagram depicting an attention block used as a part of the convolutional block of FIG. 8, according to one embodiment.

With reference to FIG. 9, there is shown an embodiment of an attention block 900, which may be used as a part of one or more convolutional layers of the CNN. For example, the attention block 900 is used as the attention block 822, 822', 822", 836, 836', 836" in the CNN 702. In embodiments, the attention blocks 822, 822', 822", 836, 836', 836" are channel attention blocks in that each attention block operates on a different channel, namely red, green, and blue, in the depicted embodiment. Processing of the attention block 900 begins with a first convolution operation 902, wherein a 1×1@4 convolution with a stride of 3 is used, and this operation 902 is followed by a PReLU activation 904. Then, the following is performed in the following order: a second convolution operation 906, a PReLU activation 908, a third convolution operation 910, another PReLU activation 912, a fourth convolution operation 914, a PReLU activation 916, global average pooling 918, a fifth convolution operation 920, another PReLU activation 922, a sixth convolution operation 926, and finally a sigmoid activation 928. In the depicted embodiment, a 3×3@4 convolution with a stride of 3 is used for the second convolution operation 906, the third convolution operation 910, and the fourth convolution operation 914, and a 1×1@4 convolution is used for the first convolution operation 902, the fifth convolution operation 920, and the sixth convolution operation 926.

The above-described model processes raw RGBG Bayer data directly from the camera sensor. The input is organized into four feature maps, each corresponding to an RGBG color channel, utilizing the space-to-depth operation. Subsequently, three model branches, aligned with the R, G, and B color channels, process this input, consisting of D residual building blocks (defaulting to 2 if unspecified). After the depth-to-space operation at each branch's end, their outputs concatenate into the reconstructed RGB photo. When running the model on mobile NPUs or GPUs, memory allocation is typically per layer/operator. Hence, maximum RAM consumption is determined by the largest layer becoming a bottleneck for high-resolution inference. To minimize RAM usage, the model employs only four convolutional filters in each layer, at least in embodiments. This is the smallest filter size, and with 4 input channels, it prevents information loss. Each convolutional layer is followed by PReLU activation with shared non-channel dimensions, learning only four parameters for each input channel. The proposed LISP model processes sensor data in three separate branches to adhere to memory constraints and enhance performance. Using multiple branches enables accurate image demosaicing and texture reconstruction, as well as allowing the model to learn distinct features for each color space, focusing on relevant information. This branching structure is advantageous for parallel processing if sufficient RAM is available, reducing runtime by up to three times. Alternatively, branches can be executed sequentially for excessively high-resolution photos. To enable global image processing (e.g., white balancing), we incorporate an enhanced channel attention block. Unlike standard attention units, the disclosed structure of the present embodiment involves a 1×1 convolution with stride 3, three 3×3 convolutional blocks, and average pooling, providing content-dependent features. This aggressive dimensionality reduction makes the architecture both performant and computationally efficient, with an execution time approximately half that of a normal 3×3 convolution.

Any one or more of the processors discussed herein may be implemented as any suitable electronic hardware that is capable of processing computer instructions and may be selected based on the application in which it is to be used. Examples of types of processors that may be used include central processing units (CPUs), graphics processing units (GPUs), field-programmable gate arrays (FPGAs), application specific integrated circuits (ASICs), microprocessors, microcontrollers, etc. Any one or more of the non-transitory, computer-readable memory discussed herein may be implemented as any suitable type of memory that is capable of storing data or information in a non-volatile manner and in an electronic form so that the stored data or information is consumable by the processor. The memory may be any a variety of different electronic memory types and may be selected based on the application in which it is to be used. Examples of types of memory that may be used include including magnetic or optical disc drives, ROM (read-only memory), solid-state drives (SSDs) (including other solid-state storage such as solid state hybrid drives (SSHDs)), other types of flash memory, hard disk drives (HDDs), non-volatile random access memory (NVRAM), etc. It should be appreciated that any one or more of the computers discussed herein may include other memory, such as volatile RAM that is used by the processor, and/or multiple processors.

It is to be understood that the foregoing description is of one or more embodiments of the invention. The invention is not limited to the particular embodiment(s) disclosed herein, but rather is defined solely by the claims below. Furthermore, the statements contained in the foregoing description relate to the disclosed embodiment(s) and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art.

As used in this specification and claims, the word "enhancement", "enhanced", and its other forms are not to be construed as limiting the invention to any particular type or manner of image enhancement, but are generally used for facilitating understanding of the above-described technology, and particularly for conveying that such technology is used to address degradations of an image. However, it will be appreciated that a variety of image enhancement techniques may be used, and each image enhancement technique is a technique for addressing a specific degradation or class of degradations of an image, such as those examples provided herein.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all of the following: "A"; "B"; "C"; "A and B"; "A and C"; "B and C"; and "A, B, and C."

The invention claimed is:

1. A method of enhancing an image using a machine learning model, comprising:
   obtaining image data representing an image; and
   generating enhanced image data representing an enhanced image based on performing inference for a machine learning model, wherein the machine learning model has an inference encoder configured to generate latent image feature data based on the image data and at least one decoder configured to receive the latent image feature data from the inference encoder;
   wherein knowledge is imparted into the inference encoder from one or more teacher encoders as a result of a knowledge transfer training process, wherein the knowledge transfer training process includes: training each of the one or more teacher encoders as a part of a teacher network configured to perform an image reconstruction task based on learned knowledge obtained by the teacher encoder, and transferring the learned knowledge of the teacher encoder to the inference encoder.

2. The method of claim 1, wherein the inference network learning process includes minimizing a difference between parameter values of the inference encoder and at least one of the one or more the teacher encoders.

3. The method of claim 1, wherein the inference encoder and the at least one decoder form a student network, wherein the teacher network is configured to reconstruct a clean version of an image without degradations, and wherein the student network is configured to generate a clean version of a degraded image.

4. The method of claim 1, wherein the one or more teacher encoders is a plurality of teacher encoders, wherein each of the plurality of teacher encoders is used as a part of one of a plurality of teacher networks, wherein a first teacher network of the plurality of teacher network is directed to a first degradation removal task, and wherein a second teacher network of the plurality of teacher network is directed to a second degradation removal task that is for addressing a different degradation than a degradation addressed by the first degradation task.

5. The method of claim 4, wherein the degradation addressed by the first degradation task is flare suppression, and wherein the degradation addressed by the second degradation task is noise removal.

6. The method of claim 1, wherein the at least one decoder includes a first decoder for lens flare suppression and a second decoder for noise removal.

7. The method of claim 1, wherein the student network and/or the teacher network are configured to take RAW image data as input and generate processed image data as output.

8. The method of claim 1, wherein the inference encoder includes two or more convolutional blocks, and wherein at least one convolutional block of the two or more convolutional blocks includes at least two independent processing pipelines with each being for processing RAW data of a different channel.

9. A method of training a machine learning (ML) based image signal processing (ISP) model, comprising:
   obtaining a plurality of image training data entries, wherein each image training data entry of the plurality of image training data entries includes degraded image data and clean image data, wherein the degraded image data represents a degraded version of a training image, and wherein the clean image data represents a clean version of the training image;
   training a teacher encoder using the plurality of image training data entries by, for each image training data entry of the plurality of image training data entries:
      inputting the clean image data of the image training data entry into the teacher encoder to obtain clean latent feature data;
      generating reconstructed clean image data using a teacher decoder that takes, as input, the clean latent feature data and outputs the reconstructed clean image data; and
      adjusting parameters of the teacher encoder using the clean image data and the reconstructed image data whereby the parameters of the teacher encoder embody learned knowledge; and
   transferring the learned knowledge of the teacher encoder to an inference encoder through an inference network learning process that includes adjusting parameter values of the inference encoder based on parameter values of the teacher encoder.

10. The method of claim 9, wherein the degraded version of the training image includes one or more lens flares and/or noise.

11. The method of claim 9, wherein, as a part of the inference network learning process, the inference encoder is considered a part of a student network configured to generate a clean version of a degraded image.

12. The method of claim 9, wherein the inference encoder includes a plurality of convolutional blocks, and wherein each convolutional block includes one or more convolution operations that are performed on data of a different channel.

13. The method of claim 12, wherein the inference encoder includes at least three independent processing pipelines, each of which is for one of three color channels.

14. The method of claim 13, wherein the three color channels correspond to red (R), green (G), and blue (B).

15. The method of claim 9, wherein the degraded image data for each training data entry of the plurality of training data entries is generated based on inputting a clean processed image into a reverse image signal processing (ISP) pipeline that generates degraded RAW image data as the degraded image data for the training data entry.

16. The method of claim 15, wherein a flare degradation is introduced prior to mosaicing of image data in order to generate the degraded RAW image data.

17. The method of claim 16, wherein noise is introduced after mosaicing of the image data in order to generate the degraded RAW image data.

18. An image enhancement processing system, comprising:

a computer subsystem communicatively coupled to an image sensor so as to receive sensor data therefrom and having at least one processor and memory storing computer instructions that, when executed by the at least one processor, cause the image enhancement processing system to:

obtain image data representing an image; and generate enhanced image data representing an enhanced image based on performing inference for a machine learning model, wherein the machine learning model has an inference encoder configured to generate latent image feature data based on the image data and at least one decoder configured to receive the latent image feature data from the inference encoder;

wherein knowledge is imparted into the inference encoder from one or more teacher encoders as a result of a knowledge transfer training process, wherein the knowledge transfer training process includes: training each of the one or more teacher encoders as a part of a teacher network configured to perform an image reconstruction task based on learned knowledge obtained by the teacher encoder, and transferring the learned knowledge of the teacher encoder to the inference encoder.

19. The image enhancement processing system of claim 18, further comprising the image sensor, and wherein the image data is obtained from the image sensor as RAW image data.

20. A vehicle subsystem having vehicle electronics that include the image sensor and the image enhancement processing system of claim 18.

\* \* \* \* \*